United States Patent
White et al.

(10) Patent No.: US 10,166,855 B2
(45) Date of Patent: Jan. 1, 2019

(54) VEHICLE, SYSTEM, AND METHOD OF CALCULATING AN ENGINE TORQUE REQUEST VALUE

(71) Applicant: GM GLOBAL TECHNOLOGY OPERATIONS LLC, Detroit, MI (US)

(72) Inventors: Marsella L. White, Howell, MI (US); Michael G. Petrucci, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 119 days.

(21) Appl. No.: 15/141,199

(22) Filed: Apr. 28, 2016

(65) Prior Publication Data

US 2017/0074193 A1    Mar. 16, 2017

Related U.S. Application Data

(60) Provisional application No. 62/217,849, filed on Sep. 12, 2015.

(51) Int. Cl.
| | |
|---|---|
| *B60K 6/52* | (2007.10) |
| *F02D 41/02* | (2006.01) |
| *B60L 7/10* | (2006.01) |
| *B60K 6/48* | (2007.10) |
| *F02D 11/10* | (2006.01) |

(Continued)

(52) U.S. Cl.
CPC ............... *B60K 6/52* (2013.01); *B60K 6/48* (2013.01); *B60L 7/10* (2013.01); *B60W 10/06* (2013.01); *B60W 10/08* (2013.01); *B60W 20/11* (2016.01); *B60W 40/1005* (2013.01); *F02D 11/105* (2013.01); *F02D 41/0225* (2013.01); *B60W 20/13* (2016.01); *B60W 2520/10* (2013.01); *B60W 2540/10* (2013.01); *B60W 2710/0666* (2013.01); *F02D 2250/18* (2013.01); *Y02T 10/6221* (2013.01); *Y02T 10/6265* (2013.01); *Y02T 10/6286* (2013.01); *Y10S 903/905* (2013.01); *Y10S 903/916* (2013.01)

(58) Field of Classification Search
CPC .... B60K 6/24; B60K 6/48; B60K 6/52; B60L 7/10; B60W 20/14; B60W 2520/105; B60W 2710/0666; B60W 20/11; B60W 10/06; B60W 10/08; B60W 40/1005; B60W 20/13; B60W 2520/10; B60W 2540/10; F02D 11/105; F02D 2250/18; F02D 41/0225; Y10S 903/905; Y10S 903/916; Y02T 10/6221; Y02T 10/6265; Y02T 10/6286
USPC .......................................................... 701/22
See application file for complete search history.

(56) References Cited

U.S. PATENT DOCUMENTS

| | | | | |
|---|---|---|---|---|
| 4,856,369 | A | * | 8/1989 | Stockton ............. F16H 37/0833 74/665 GE |
| 5,378,053 | A | * | 1/1995 | Patient ................... B60K 28/16 188/156 |

(Continued)

*Primary Examiner* — Angelina Shudy
(74) *Attorney, Agent, or Firm* — Quinn IP Law

(57) ABSTRACT

A method of calculating an engine torque request value for a vehicle includes a vehicle controller receiving a regeneration torque request value corresponding to a regeneration torque to be generated by an energy recovery mechanism. The vehicle controller further receives a desired acceleration value, and calculates the engine torque request value based on the regeneration torque request value and the desired acceleration value. The vehicle controller may then operate the engine in accordance with the engine torque request value.

20 Claims, 3 Drawing Sheets

(51) Int. Cl.
*B60W 10/06* (2006.01)
*B60W 10/08* (2006.01)
*B60W 40/10* (2012.01)
*B60W 20/11* (2016.01)
*B60W 20/13* (2016.01)

(56) References Cited

U.S. PATENT DOCUMENTS

| | | | | |
|---|---|---|---|---|
| 5,656,921 | A * | 8/1997 | Farrall | B60K 6/48 322/40 |
| 6,464,026 | B1 * | 10/2002 | Horsley | B60K 6/48 180/65.25 |
| 6,598,945 | B2 * | 7/2003 | Shimada | B60K 6/44 303/152 |
| 7,057,304 | B2 * | 6/2006 | Ueda | B60K 6/365 180/65.1 |
| 7,931,555 | B2 * | 4/2011 | Iwanaka | B60K 6/365 475/5 |
| 8,616,660 | B2 * | 12/2013 | Kim | B60T 1/10 303/152 |
| 8,731,751 | B2 * | 5/2014 | Simon, Jr. | B60K 6/48 701/22 |
| 8,731,762 | B1 * | 5/2014 | Wang | B60L 15/2045 701/22 |
| 8,899,027 | B2 * | 12/2014 | Roos | F01N 3/0238 60/303 |
| 9,238,412 | B2 * | 1/2016 | Kidston | B60L 7/26 |
| 9,266,466 | B2 * | 2/2016 | Mizui | H02P 3/14 |
| 9,302,674 | B2 * | 4/2016 | Aldrich, III | B60L 7/18 |
| 9,365,208 | B2 * | 6/2016 | Grover, Jr. | B60W 10/18 |
| 9,416,736 | B2 * | 8/2016 | Bergkoetter | F02D 13/06 |
| 9,527,375 | B2 * | 12/2016 | Clark | B60K 6/26 |
| 9,630,623 | B2 * | 4/2017 | Fairgrieve | B60L 3/106 |
| 9,638,113 | B2 * | 5/2017 | Butcher | F02D 29/02 |
| 9,657,827 | B2 * | 5/2017 | Gopal | F16H 48/24 |
| 9,669,835 | B2 * | 6/2017 | Kim | F02D 41/0087 |
| 9,694,822 | B2 * | 7/2017 | Neaves | F02D 29/02 |
| 9,714,017 | B2 * | 7/2017 | Okano | B60T 8/17 |
| 9,751,522 | B2 * | 9/2017 | White | B60W 50/082 |
| 9,873,420 | B2 * | 1/2018 | White | B60W 10/18 |
| 10,029,697 | B1 * | 7/2018 | MacDonald | B60W 40/09 |
| 2002/0024306 | A1 * | 2/2002 | Imai | B60W 20/10 318/34 |
| 2002/0030408 | A1 * | 3/2002 | Niwa | B60K 6/44 303/152 |
| 2002/0036429 | A1 * | 3/2002 | Shimada | B60K 6/44 303/152 |
| 2002/0063000 | A1 * | 5/2002 | Kojima | B60K 6/48 180/65.1 |
| 2003/0098185 | A1 * | 5/2003 | Komeda | B60K 6/105 180/65.25 |
| 2004/0122579 | A1 * | 6/2004 | Ashizawa | B60L 7/26 701/70 |
| 2004/0254695 | A1 * | 12/2004 | Komiyama | B60W 50/16 701/22 |
| 2005/0003926 | A1 * | 1/2005 | Hanada | B60K 6/485 477/3 |
| 2005/0256623 | A1 * | 11/2005 | Hubbard | B60L 11/123 701/54 |
| 2005/0278106 | A1 * | 12/2005 | Simon, Jr. | B60W 10/06 701/70 |
| 2006/0194670 | A1 * | 8/2006 | Heap | B60K 6/445 477/3 |
| 2009/0057042 | A1 * | 3/2009 | Puccetti | B60K 6/485 180/65.265 |
| 2009/0102145 | A1 * | 4/2009 | Moriki | B60K 6/44 280/5.507 |
| 2009/0112386 | A1 * | 4/2009 | Saitoh | B60L 11/1887 701/22 |
| 2009/0118914 | A1 * | 5/2009 | Schwenke | B60K 6/445 701/51 |
| 2009/0204280 | A1 * | 8/2009 | Simon, Jr. | B60K 6/48 701/22 |
| 2010/0174429 | A1 * | 7/2010 | Hase | B60K 6/48 701/22 |
| 2010/0198475 | A1 * | 8/2010 | Stolzl | B60L 7/18 701/74 |
| 2010/0234169 | A1 * | 9/2010 | Miyazaki | B60K 6/38 477/3 |
| 2010/0234171 | A1 * | 9/2010 | Tanba | B60K 6/387 477/5 |
| 2010/0234173 | A1 * | 9/2010 | Miyazaki | B60K 6/387 477/5 |
| 2010/0234174 | A1 * | 9/2010 | Miyazaki | B60K 6/387 477/5 |
| 2011/0251770 | A1 * | 10/2011 | Minarcin | B60T 1/10 701/71 |
| 2012/0022735 | A1 * | 1/2012 | Tashiro | B60L 7/18 701/22 |
| 2012/0101697 | A1 * | 4/2012 | Hawkins | F16H 61/061 701/51 |
| 2012/0109439 | A1 * | 5/2012 | Akebono | B60W 10/02 701/22 |
| 2012/0316715 | A1 * | 12/2012 | Suzuki | B60K 6/48 701/22 |
| 2013/0103282 | A1 * | 4/2013 | Oh | B60W 10/06 701/84 |
| 2013/0131901 | A1 * | 5/2013 | Yamagata | B60L 7/18 701/22 |
| 2013/0133965 | A1 * | 5/2013 | Books | B60W 10/06 180/165 |
| 2013/0162009 | A1 * | 6/2013 | Mitts | B60L 3/102 303/3 |
| 2013/0210575 | A1 * | 8/2013 | Kumazaki | B60K 6/48 477/20 |
| 2013/0226420 | A1 * | 8/2013 | Pedlar | B60K 31/047 701/67 |
| 2013/0267382 | A1 * | 10/2013 | Inoue | B60L 7/18 477/111 |
| 2013/0325233 | A1 * | 12/2013 | Whitney | B60W 20/108 701/22 |
| 2014/0088812 | A1 * | 3/2014 | Kobayashi | B60K 6/48 701/22 |
| 2014/0095049 | A1 * | 4/2014 | Jentz | F02M 25/0818 701/101 |
| 2014/0330462 | A1 * | 11/2014 | Wada | B60L 3/0023 701/19 |
| 2014/0342871 | A1 * | 11/2014 | Isomura | B60K 6/48 477/5 |
| 2015/0107933 | A1 * | 4/2015 | Gopal | F16H 48/24 180/383 |
| 2015/0362065 | A1 * | 12/2015 | Johansson | B60W 30/18072 701/65 |
| 2016/0002889 | A1 * | 1/2016 | Kajita | F15B 21/14 701/50 |
| 2016/0069318 | A1 * | 3/2016 | Doering | B60W 30/19 477/102 |
| 2016/0129791 | A1 * | 5/2016 | Huh | B60L 7/26 701/70 |
| 2016/0185337 | A1 * | 6/2016 | Morita | B60K 6/48 701/22 |
| 2016/0214611 | A1 * | 7/2016 | Neaves | F02D 29/02 |
| 2017/0072780 | A1 * | 3/2017 | White | B60W 20/13 |
| 2017/0072938 | A1 * | 3/2017 | White | B60W 50/082 |
| 2017/0072940 | A1 * | 3/2017 | White | B60W 10/18 |
| 2017/0072941 | A1 * | 3/2017 | White | B60W 20/14 |
| 2017/0074193 | A1 * | 3/2017 | White | F02D 41/0225 |
| 2017/0129323 | A1 * | 5/2017 | Fremau | B60K 6/547 |
| 2017/0130827 | A1 * | 5/2017 | Ando | F16D 48/06 |
| 2017/0210368 | A1 * | 7/2017 | Svensson | B60T 8/245 |
| 2017/0274902 | A1 * | 9/2017 | Kumada | B60W 30/188 |
| 2017/0342931 | A1 * | 11/2017 | Dudar | F02D 41/222 |

* cited by examiner

VEHICLE, SYSTEM, AND METHOD OF CALCULATING AN ENGINE TORQUE REQUEST VALUE

CROSS-REFERENCE TO RELATED APPLICATIONS

This application claims the benefit of U.S. Provisional Patent Application Ser. No. 62/217,849, filed on Sep. 12, 2015, the disclosure of which is hereby incorporated by reference.

TECHNICAL FIELD

The disclosure generally relates to vehicles with electric regeneration capabilities and associated methods.

BACKGROUND

Many conventional vehicles utilize friction brakes to slow and/or stop the vehicle. Typically, brake pads may engage a rotor or a drum of a wheel. The energy from the motion of the vehicle is thus lost as heat from surfaces of the brake pads, rotors, and/or drums.

Electric and hybrid-electric vehicles often utilize regenerative braking to recover energy while slowing and/or stopping the vehicle. Typically, an electric motor is coupled to an axle of the vehicle. The electric motor acts as a generator by producing electricity by conversion of the kinetic energy of the vehicle. This electricity may be stored in a battery or immediately used in operating the vehicle. In another configuration, a vehicle may be equipped with a flywheel that is utilized for energy storage.

Typical regenerative braking systems only produce electricity when the vehicle is decelerating. In some conditions, it may be advantageous to produce electricity while the vehicle is accelerating.

SUMMARY

A vehicle is provided, and includes a first axle coupled to at least one wheel and a second axle coupled to at least one wheel. An engine is coupled to the first axle to drive the at least one wheel coupled to the first axle. The vehicle also includes an energy recovery mechanism coupled to the second axle. A controller is in communication with the internal combustion engine, and is configured to calculate an engine torque request value based at least on a regeneration torque request value and a desired acceleration value.

A method of calculating an engine torque request value for a vehicle is also provided. The method includes a vehicle controller receiving a regeneration torque request value corresponding to the regeneration torque to be generated by an energy recovery mechanism. A desired acceleration value is also received by the vehicle controller. An engine torque request value is then calculated based on the regeneration torque request value and the desired acceleration value. The engine may then be operated in accordance with the engine torque request value.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," "front," "back," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions. Moreover, the term "coupled," as used herein, may denote either a direct connection between components or an indirect connection between components, wherein the two components are not in physical contact with one another.

Referring to the figures, wherein like numerals indicate like parts throughout the several views, a vehicle 100, system 115, and method 200 are shown and described herein.

Figure 1:
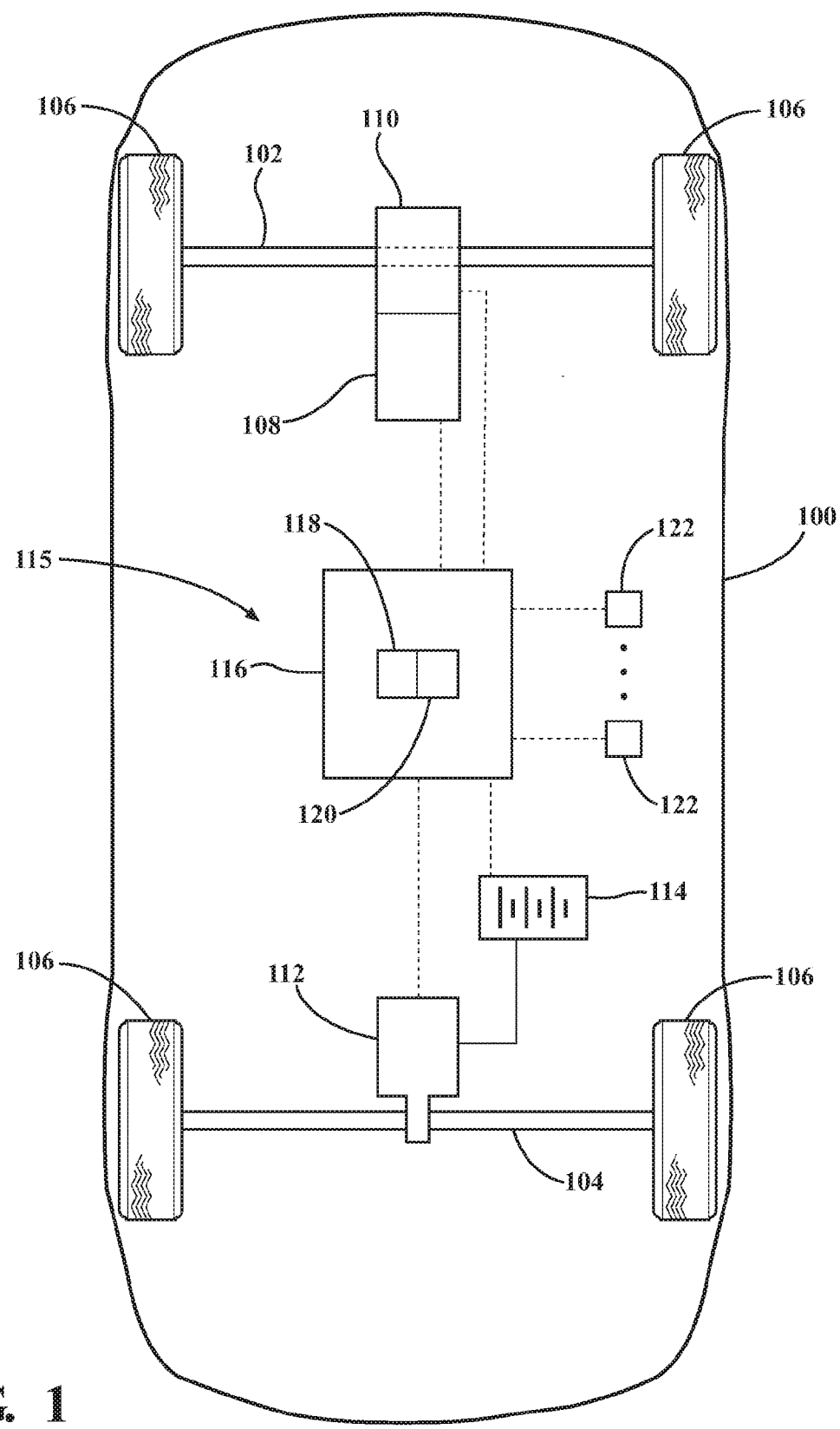
FIG. 1 is a block diagram of a vehicle according to one exemplary embodiment.

Referring to FIG. 1, the vehicle 100 includes a first axle 102 and a second axle 104. At least one wheel 106 is coupled to each axle 102, 104. In the exemplary embodiment, where the vehicle 100 is implemented as an automobile (not separately numbered), two wheels 106 are coupled to each axle 102, 104. However, it should be appreciated that in another exemplary vehicle 100, such as a motorcycle (not shown), a single wheel 106 may be coupled to each axle 102, 104. Of course, any number of wheels 106 may be coupled to each axle 102, 104 as is appreciated by those skilled in the art. The wheels 106 may operatively engage the ground, a roadway, and/or other surface as appreciated by those skilled in the art. For instance, a tire (not shown) may be coupled to one or more of the wheels 106, as is also appreciated by those skilled in the art.

The vehicle 100 also includes an engine 108. In the exemplary embodiment, the engine 108 is an internal combustion engine (not separately numbered). However, it should be appreciated that other types of engines 108 may be implemented. In one example, the engine 108 may be implemented as an external combustion engine, e.g., a steam engine. In another example, the engine 108 may be implemented as an electric motor. Those skilled in the art will appreciate other devices that may be implemented as the engine 108 described herein.

The engine 108 is coupled to the first axle 102 to drive the at least one wheel 106 coupled to the first axle 102. That is, the engine 108 of the exemplary embodiment generates a rotary motion that is utilized to turn the wheel 106, as is well known to those skilled in the art. In the exemplary embodiment, a transmission 110 is coupled between the engine 108 and the first axle 102. The transmission 110 includes various gearings to change the rotational speed ratio between the engine and the first axle 102.

An energy recovery mechanism 112 is coupled to the second axle 104. The energy recovery mechanism 112 may generate electricity from movement, i.e., rotation, of the second axle 104. In the illustrated embodiment, the energy recovery mechanism 112 is an electric motor (not separately numbered) that may be utilized as a generator. However, by implementing the energy recovery mechanism 112 with an electric motor, the mechanism 112 may also actuate movement, i.e., rotation, of the second axle 104. That is, the energy recovery mechanism 112 may drive the second axle 104 and, as such, the vehicle 100, in certain circumstances and/or conditions.

The vehicle 100 further includes an energy storage unit 114 electrically connected to the energy recovery mechanism 112. The energy storage unit 114 may be implemented as a battery (not separately numbered) comprising one or more electrical and/or electrochemical cells. The energy storage unit 114 may also be implemented as a capacitor (not shown), as appreciated by those skilled in the art. The energy recovery mechanism 112 may send electricity to the energy storage unit 114 and vice-versa.

The energy storage unit 114 may also be implemented with a flywheel (not shown). In one example, the energy recovery mechanism 112 includes a gearset that is mechanically attached to the flywheel to generate flywheel rotational speed. The rotational speed can then be dissipated directly to the second axle 104. Of course, other implementations of a flywheel for energy storage will be appreciated by those skilled in the art.

In the exemplary embodiment, the first axle and the second axle are mechanically separated from one another. As such, the engine 108 and the energy recovery mechanism 112 are decoupled from one another. Said another way, the vehicle 100 includes a decoupled propulsion system (not numbered). However, it should be appreciated that other decoupled propulsion system embodiments, where a propulsion actuator on a wheel applies torque and a propulsion/energy recovery actuator on another wheel which can capture energy, may alternatively be implemented.

The vehicle 100 of the illustrated embodiment includes a system 115 for controlling aspects of the vehicle 115. Accordingly, the system 115 also includes at least one controller 116. In the exemplary embodiment, one controller 116 is shown, but those skilled in the art appreciate that multiple controllers 116 may be utilized. The controller 116 of the exemplary embodiment includes a processor 118 capable of performing calculations and executing instructions (i.e., running a program). The processor 118 may be implemented with a microprocessor, microcontroller, application specific integrated circuit ("ASIC") or other suitable device. Of course, the controller 116 may include multiple processors 118 which may, or may not, be disposed in multiple locations. The controller 116 of the exemplary embodiment also includes a memory 120 capable of storing data and in communication with the processor 118. The memory 120 may be implemented with semiconductors (not shown) or any other suitable devices. Multiple memories 120 may also be utilized.

The controller 116 is in communication with the engine 108 such that data may be sent to the engine 108 and/or received from the engine 108. That is, the controller 116 may be in communication with a separate engine control unit (not shown) and/or in communication with any of various devices utilized to control the engine 108. The controller 116 is also in communication with the energy storage unit 114 such that data may be sent to the energy storage unit 114 and/or received from the energy storage unit 114. The controller 116 may also be in communication with the transmission 110 and the energy storage unit 114. The controller 116 may also be in communication with one or more sensors 122. For example, one sensor 122 may be coupled to an acceleration pedal (not shown) to receive a desired acceleration from a driver of the vehicle 100.

The engine 108 may be utilized to indirectly charge the energy storage unit 114 via the energy recovery mechanism 112 via a "through the road charging" process. More particularly, the at least one wheel 106 coupled to the engine 108 rotates to move the vehicle 100 along a road. The at least one wheel 106 coupled to the energy recovery mechanism 112 is thus also rotated due to the movement provided by the engine 108. This allows the energy recovery mechanism 112 to generate electricity, which can be stored in the energy storage unit 114. Thus, charging of the energy storage unit 114 may occur even when the vehicle is accelerating.

Of course, the energy recovery mechanism 112 will function to slow the vehicle 100. As such, the amount of torque generated by the engine 108 must be sufficient to first satisfy the acceleration requirements of the vehicle 100 before satisfying the energy storage unit 114 charging requirements. Thus, an amount of torque to be requested of the engine, i.e., an engine torque request value, should be determined.

Figure 2:
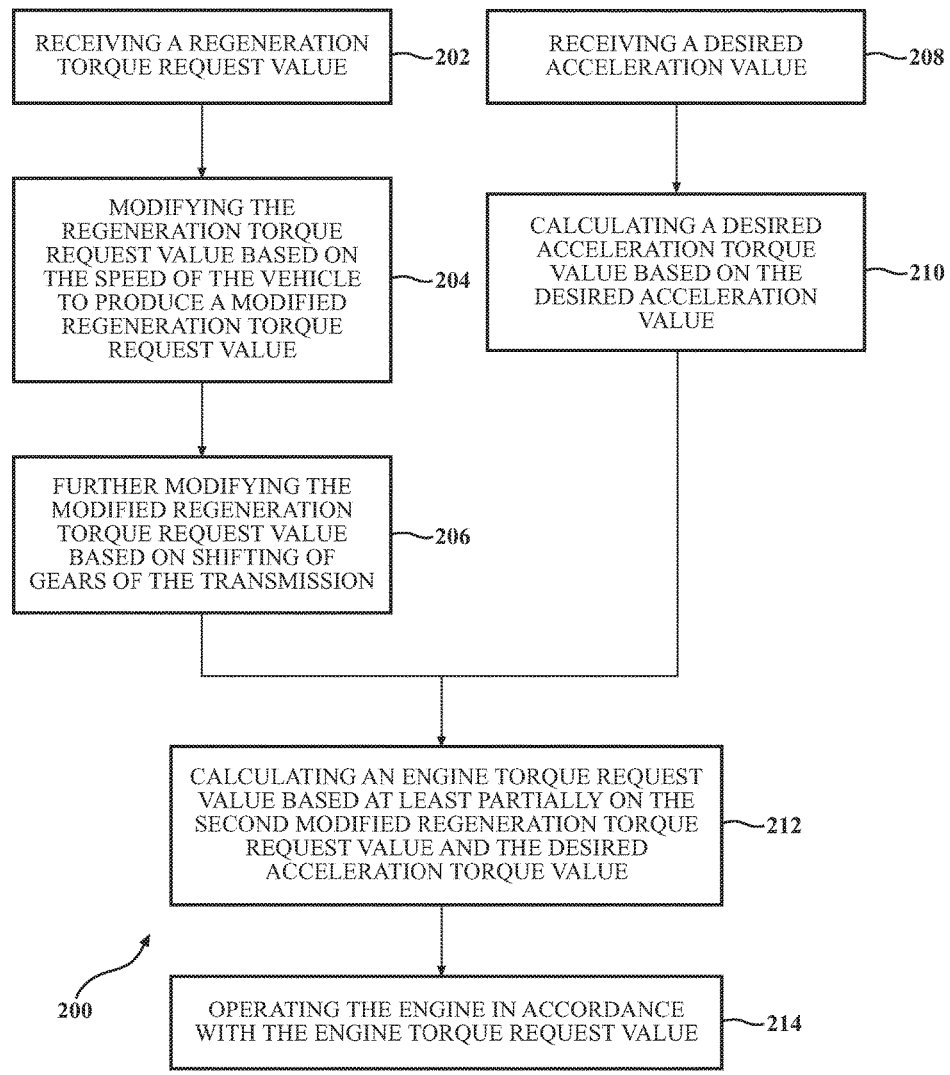
FIG. 2 is a flowchart of a method of calculating an engine torque request value according to one exemplary embodiment.

Referring now to FIG. 2, the method 200 of calculating the engine torque request value may be implemented utilizing the controller 116 and/or other devices as is appreciated by those skilled in the art. The method 200 includes, at 202, receiving a regeneration torque request value with the vehicle controller 116. This value corresponds to an amount of regeneration torque that is being requested. The regeneration torque request value may be determined by another routine or program being run in the controller 116 and is related to an amount of electrical charge that is required to further charge the energy storage unit 114. The regeneration torque request value may be limited by the dynamic driving conditions of the vehicle 100.

The regeneration torque request value may be modified by one or more factors. These factors may include, but are not limited to, the speed of the vehicle 100 and the changing gears of the transmission of the vehicle 100.

Figure 3:
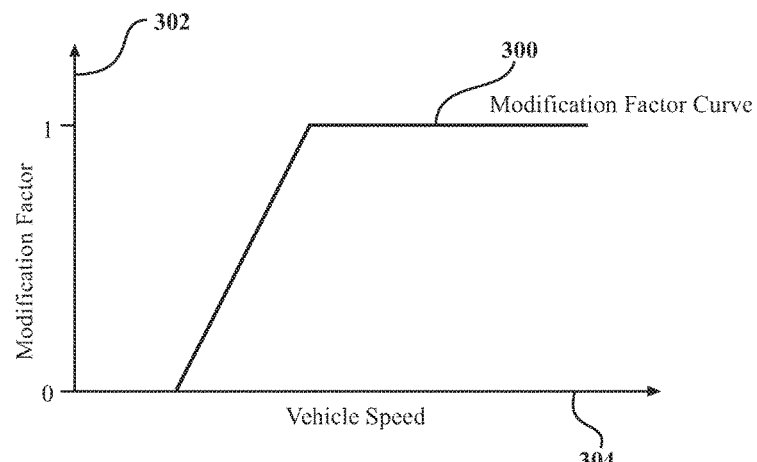
FIG. 3 is a graph illustrating the relationship between vehicle speed and a modification factor according to one exemplary embodiment.

As such, the method 200 may further include, at 204, modifying the regeneration torque request value based on the speed of the vehicle 100 to produce a modified regeneration torque request value. More specifically, in the exemplary embodiment, the regeneration torque request value is multiplied by a modification factor based on the vehicle speed. FIG. 3 shows an exemplary curve 300 wherein the modification factor is a number between 0 and 1 and is shown on a vertical axis 302 and the speed of the vehicle 100 is shown on a horizontal axis 304. For instance, the modification factor may be 0 at low speeds, e.g., when the vehicle 100 is stopped or starting to move, and 1 at high speeds. Of course, the example modification factor shown in FIG. 3 is merely one of numerous possibilities that may be implemented.

Figure 4:
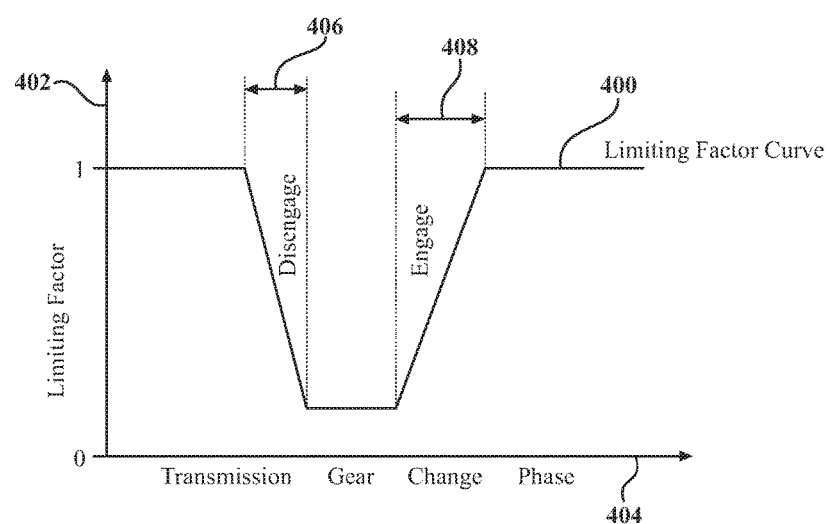
FIG. 4 is a graph illustrating the relationship between transmission gear changing and a modification factor according to one exemplary embodiment.

The method 200 may also include, at 206, further modifying the modified regeneration torque request value from 204 based on changing of gears of the transmission 110. More specifically, in the exemplary embodiment, the modified regeneration torque request value is multiplied by a limiting factor, to re-define the modified regeneration torque request, based on whether a gear change is in progress, the specific gears that the transmission is changing between, and the phase of changing gears of the transmission (i.e., engaging or disengaging). FIG. 4 shows an exemplary curve 400 wherein the limiting factor is shown on a vertical axis 402 and the transmission gear change phase is shown on a horizontal axis 404. For instance, the limiting factor may be 1 when no gear change is occurring, drop to 0.2 when a disengagement 406 of the transmission 110 is occurring, and then return to 1 when an engagement 408 of the transmission 110 is occurring. Of course, the example modification factor shown in FIG. 4 is merely one of numerous possibilities that may be implemented.

The method 200 of the exemplary embodiment also includes, at 208 receiving a desired acceleration value, with the vehicle controller 116. This desired acceleration value may, in one embodiment, correspond to the position of the acceleration pedal which is actuated by the driver of the vehicle 100. The method 200 then may include, at 210, calculating a desired acceleration torque value based on the desired acceleration value. The desired acceleration torque value is the amount of torque output required for the vehicle 100 to achieve the drivers desired acceleration.

The modified regeneration torque request value and the desired acceleration value are utilized to calculate an engine torque request value. As such, the method 200 of the exemplary embodiment also includes, at 212, calculating an engine torque request value based at least partially on the modified regeneration torque request value and the desired acceleration torque value. At 214 in FIG. 2, the engine torque request value is then utilized to control operation, e.g., rotation speed, of the engine 108.

Other factors may also be utilized to calculate the engine torque request value. These factors include, but are not limited to, a transmission gear ratio, a final drive ratio, an estimated losses torque value, an aerodynamic drag torque value, a maximum engine torque value, and a determination as to whether the vehicle 100 is driving on a track (e.g., a racetrack, autocross, gymkhana, or sporty street). One technique to determine whether the vehicle 100 is driving on a track is described in U.S. Pat. No. 6,408,229.

The estimated losses torque value is calculated using a function of the transmission gear ratio, the final drive ratio, the engine speed, the engine torque, and/or brake drag. These factors are converted to a torque-based value for ease in later calculations. The aerodynamic drag torque value is based on an aerodynamic drag force value that is also converted to a torque-based value. The aerodynamic drag force value may be constant based on the aerodynamic properties of the vehicle 100. Alternatively, the aerodynamic drag force value may change based on changing aerodynamic properties of the vehicle 100, e.g., the opening of a convertible top (not shown), moon roof (not shown), or change in position of a spoiler (not shown).

In the exemplary embodiment, calculating the engine torque request value includes calculating an engine torque overhead value and a total acceleration torque value as follows:

> Engine Torque Overhead Value=(Maximum Engine Torque Value*Transmission Gear Ratio*Final Drive Ratio)−Second Modified Regeneration Torque Value > Total Acceleration Torque Value=Desired Acceleration Torque Value+Estimated Losses Torque Value+Aerodynamic Drag Torque Value The engine torque overhead value is then compared to the total acceleration torque value.

If the engine torque overhead value is greater than the total acceleration torque value, then the engine torque request value is computed as follows:

> Engine Torque Request Value=Desired Acceleration Torque Value+Estimated Losses Torque Value+Aerodynamic Drag Torque Value+Second Modified Regeneration Torque Value.

Whether or not the vehicle 100 is driving on a track may also be considered when the engine torque overhead value is greater than the total acceleration torque value. If the vehicle is not driving on a track, then the controller 116 may also determine the most efficient operating gear of the transmission 110 and the most efficient operating conditions of the engine 108 to achieve the desired acceleration torque and minimize losses. More efficient operating conditions may be achieved through reduction of engine cylinders that are consuming fuel via active fuel management routines, varying the throttle position, and/or spark timing. Of course other techniques may be employed to create the most efficient operating conditions of the engine 108 as appreciated by those skilled in the art. If the vehicle 100 is driving on a track, the operating gear of the transmission 110 is determined by a predetermined performance driving gear change pattern and the engine torque request value may be constrained by this pattern.

If the engine torque overhead value is not greater than the total acceleration torque value, i.e., the engine torque overhead value is less than or equal to the total acceleration torque value, then the modified regeneration torque value is recalculated as follows:

> Modified Regeneration Torque Value=(Maximum Engine Torque Value*Transmission Gear Ratio*Final Drive Ratio)−Desired Acceleration Torque Value−Estimated Losses Torque Value−Aerodynamic Drag Torque Value Once the modified regeneration torque value is again modified according to the above equation, it may be output to the energy recover mechanism 112.

After calculating the engine torque request value, the method 200 continues, at 214, with operating the engine in accordance with the engine torque request value. In one embodiment, the controller 116 may send this value to a separate engine control module (not shown). Alternatively, the controller 116 may be in communication with the various components of the engine 108 (e.g., fuel injectors) and may utilize this value in directly operating the engine, as is appreciated by those skilled in the art.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of calculating an engine torque request value for a vehicle, the method comprising:
receiving a regeneration torque request value corresponding to the regeneration torque request value to be generated by an energy recovery mechanism, with a vehicle controller;
receiving a desired acceleration value, with the vehicle controller;
calculating an engine torque request value, with the vehicle controller, based on the regeneration torque request value and the desired acceleration value; and
operating an engine, with the vehicle controller, in accordance with the engine torque request value;
modifying the regeneration torque request value to define a modified regeneration torque request value;
wherein modifying the regeneration torque request value includes multiplying the regeneration torque request value by a multiplication factor to define the modified regeneration torque request value, wherein the multiplication factor is based on a speed of the vehicle;

re-defining the modified regeneration torque request value based on a gear shift in a transmission of the vehicle;

wherein re-defining the modified regeneration torque request value includes multiplying the modified regeneration torque request value by a limiting factor to re-define the modified regeneration torque request value, wherein the limiting factor is based on the gear shift in the transmission;

wherein calculating the engine torque request value based on the regeneration torque request value and the desired acceleration value further includes calculating the engine torque request value based on at least one of: a transmission gear ratio, a final drive ratio, an estimated losses torque value, an aerodynamic drag torque value, a maximum engine torque value, and a determination of vehicle operation on a race track;

wherein calculating the engine torque request value includes calculating an engine torque overhead value and a total acceleration torque value;

wherein calculating the engine torque overhead value includes solving an equation defined as: Engine Torque Overhead Value=(Maximum Engine Torque Value×Transmission Gear Ratio×Final Drive Ratio)−Modified Regeneration Torque Request Value.

2. The method set forth in claim 1, wherein calculating the engine torque request value based on the regeneration torque request value and the desired acceleration value is further defined as calculating the engine torque request value based on the modified regeneration torque request value and the desired acceleration value.

3. The method set forth in claim 1, wherein calculating the total acceleration torque value includes solving an equation defined as:

Total Acceleration Torque Value=Desired Acceleration Torque Value+Estimated Losses Torque Value+Aerodynamic Drag Torque Value+Modified Regeneration Torque Request Value.

4. The method set forth in claim 1, further comprising comparing the engine torque overhead value to the total acceleration torque value to determine that the engine torque overhead value is greater than the total acceleration torque value, or that the engine torque overhead value is not greater than the total acceleration torque value.

5. The method set forth in claim 4, wherein calculating the engine torque request value is further defined as calculating the engine torque request value from a following equation when the engine torque overhead value is greater than the total acceleration torque value:

Engine Torque Request Value=Desired Acceleration Torque Value+Estimated Losses Torque Value+Aerodynamic Drag Torque Value+Modified Regeneration Torque Request Value.

6. The method set forth in claim 4, wherein the modified regeneration torque request value is re-defined from a following equation, when the engine torque overhead value is not greater than the total acceleration torque value:

Modified Regeneration Torque Request Value=(Maximum Engine Torque Value×Transmission Gear Ratio×Final Drive Ratio)−Desired Acceleration Torque Value−Estimated Losses Torque Value−Aerodynamic Drag Torque Value.

7. The method set forth in claim 6, further comprising outputting the re-defined modified regeneration torque request value to an energy recovery mechanism of the vehicle.

8. A vehicle comprising:
a first axle coupled to at least one wheel;
a second axle coupled to at least another wheel;
an engine coupled to the first axle to drive the at least one wheel coupled to the first axle;
an energy recovery mechanism coupled to the second axle;
a controller in communication with the engine and configured to calculate an engine torque request value based on a regeneration torque request value and a desired acceleration value;
wherein the controller is configured to calculate the engine torque request value by calculating an engine torque overhead value and a total acceleration torque value;
wherein calculating the engine torque overhead value includes solving an equation defined as: Engine Torque Overhead Value=(Maximum Engine Torque Value×Transmission Gear Ratio×Final Drive Ratio)−Modified Regeneration Torque Request Value; and
wherein calculating the total acceleration torque value includes solving an equation defined as: Total Acceleration Torque Value=Desired Acceleration Torque Value+Estimated Losses Torque Value+Aerodynamic Drag Torque Value+Modified Regeneration Torque Request Value.

9. The vehicle set forth in claim 8, further comprising a transmission coupled between the engine and the first axle, and wherein the first axle and the second axle are mechanically separated.

10. The vehicle set forth in claim 9, wherein the controller is operable to receive the regeneration torque request value and the desired acceleration value.

11. The vehicle set forth in claim 10, wherein the controller is operable to modify the regeneration torque request value based on at least one of a speed of the vehicle and a gear shift in the transmission.

12. The vehicle set forth in claim 11, wherein the controller is operable to calculate the engine torque request based on at least one of: a transmission gear ratio, a final drive ratio, an estimated losses torque value, an aerodynamic drag torque value, a maximum engine torque value, and a determination of vehicle operation on a race track.

13. The vehicle set forth in claim 8, wherein the energy recovery mechanism includes an electric motor/generator.

14. A method of calculating an engine torque request value for a vehicle, the method comprising:
receiving a regeneration torque request value corresponding to the regeneration torque request value to be generated by an energy recovery mechanism, with a vehicle controller;
receiving a desired acceleration value, with the vehicle controller;
calculating an engine torque request value, with the vehicle controller, based on the regeneration torque request value and the desired acceleration value;
wherein calculating the engine torque request value includes calculating an engine torque overhead value and a total acceleration torque value;
wherein calculating the engine torque overhead value includes solving an equation defined as: Engine Torque Overhead Value=(Maximum Engine Torque Value×

Transmission Gear Ratio×Final Drive Ratio)−Modified Regeneration Torque Request Value;

wherein calculating the total acceleration torque value includes solving an equation defined as: Total Acceleration Torque Value=Desired Acceleration Torque Value+Estimated Losses Torque Value+Aerodynamic Drag Torque Value+Modified Regeneration Torque Request Value; and operating an engine, with the vehicle controller, in accordance with the engine torque request value.

15. The method set forth in claim 14, further comprising modifying the regeneration torque request value to define a modified regeneration torque request value.

16. The method set forth in claim 15, wherein modifying the regeneration torque request value includes multiplying the regeneration torque request value by a multiplication factor to define the modified regeneration torque request value, wherein the multiplication factor is based on a speed of the vehicle.

17. The method set forth in claim 16, further comprising re-defining the modified regeneration torque request value based on a gear shift in a transmission of the vehicle.

18. The method set forth in claim 17, wherein re-defining the modified regeneration torque request value includes multiplying the modified regeneration torque request value by a limiting factor to re-define the modified regeneration torque request value, wherein the limiting factor is based on the gear shift in the transmission.

19. The method set forth in claim 18, wherein calculating the engine torque request value based on the regeneration torque request value and the desired acceleration value is further defined as calculating the engine torque request value based on the modified regeneration torque request value and the desired acceleration value.

20. The method set forth in claim 19, wherein calculating the engine torque request value based on the regeneration torque request value and the desired acceleration value further includes calculating the engine torque request value based on at least one of: a transmission gear ratio, a final drive ratio, an estimated losses torque value, an aerodynamic drag torque value, a maximum engine torque value, and a determination of vehicle operation on a race track.

\* \* \* \* \*